(12) United States Patent
Kozuki

(10) Patent No.: US 10,215,849 B2
(45) Date of Patent: Feb. 26, 2019

(54) CTFM DETECTION APPARATUS AND UNDERWATER DETECTION APPARATUS

(71) Applicant: Furuno Electric Co., Ltd., Nishinomiya (JP)

(72) Inventor: Kohei Kozuki, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 344 days.

(21) Appl. No.: 15/139,879

(22) Filed: Apr. 27, 2016

(65) Prior Publication Data

US 2017/0315220 A1 Nov. 2, 2017

(51) Int. Cl.
| G01S 7/00 | (2006.01) |
| G01S 7/536 | (2006.01) |
| G01S 15/60 | (2006.01) |
| G01S 7/56 | (2006.01) |
| G01S 15/96 | (2006.01) |
| G01S 15/89 | (2006.01) |

(52) U.S. Cl.
CPC ............... *G01S 7/536* (2013.01); *G01S 7/56* (2013.01); *G01S 15/60* (2013.01); *G01S 15/8902* (2013.01); *G01S 15/96* (2013.01)

(58) Field of Classification Search
USPC .......................................................... 367/88
See application file for complete search history.

(56) References Cited

U.S. PATENT DOCUMENTS

| 7,652,952 B2 | 1/2010 | Betts et al. |
| 7,710,825 B2 | 5/2010 | Betts et al. |
| 7,729,203 B2 | 6/2010 | Betts et al. |
| 7,755,974 B2 | 7/2010 | Betts et al. |
| 2002/0188200 A1* | 12/2002 | Mauchamp ............... A61B 8/00 600/439 |
| 2006/0023570 A1* | 2/2006 | Betts ....................... G01S 7/521 367/88 |

(Continued)

FOREIGN PATENT DOCUMENTS

| EP | 0199571 A1 | 10/1986 |
| JP | 2868869 B2 | 3/1999 |

OTHER PUBLICATIONS

"StructureScan HD Sonar Imaging System," Lowrance Marine Electronics Website, Available Online at http://www.lowrance.com/en-US/Products/Sonar/Lowrance-StructureScan-HD-en-us.aspx, Available as Early as Oct. 2, 2012, 3 pages.

*Primary Examiner* — James R Hulka
(74) *Attorney, Agent, or Firm* — Alleman Hall Creasman & Tuttle LLP

(57) ABSTRACT

A Continuous Transmission Frequency Modulated (CTFM) detection apparatus includes a projector, a sensor, and a hardware processor. The projector is configured to transmit underwater a frequency modulated transmission wave based on a transmission signal. The sensor is configured to form a reception beam directed downward and laterally outward to a side of the boat or the ship and receive a reflected wave, the reflected wave comprising a reflection of the transmission wave on a target object. The hardware processor is programmed to at least generate a beat signal based at least in part on the transmission signal and the reflected wave, extract a processing signal from the beat signal, and generate an image information related to the target object based on the extracted processing signal.

10 Claims, 10 Drawing Sheets

(56) References Cited

U.S. PATENT DOCUMENTS

| | | | | |
|---|---|---|---|---|
| 2007/0025183 A1* | 2/2007 | Zimmerman | ....... | G01S 7/52003 367/88 |
| 2008/0108901 A1* | 5/2008 | Baba | .................... | A61B 8/0833 600/459 |
| 2008/0112265 A1* | 5/2008 | Urbano | ............... | G01S 7/52096 367/87 |
| 2009/0122647 A1* | 5/2009 | Betts | ........................ | G01S 7/521 367/88 |
| 2009/0147622 A1* | 6/2009 | Betts | ........................ | G01S 7/521 367/88 |
| 2009/0147623 A1* | 6/2009 | Betts | ........................ | G01S 7/521 367/88 |
| 2013/0208568 A1* | 8/2013 | Coleman | ................ | G01S 7/521 367/88 |
| 2014/0269192 A1* | 9/2014 | Proctor | ............... | G01S 15/8902 367/88 |
| 2016/0259053 A1* | 9/2016 | Proctor | ............... | G01S 15/8902 |

* cited by examiner

CTFM DETECTION APPARATUS AND UNDERWATER DETECTION APPARATUS

BACKGROUND

Conventionally-known detection apparatuses include, for example, detection apparatuses described in U.S. Pat. No. 7,652,952, which discloses a side scan sonar functioning based on pulsed transmission. One difficulty encountered with such technology is that the refresh rate is slow, which creates zones that cannot be detected if the ship exceeds a certain speed. With a side scan sonar functioning based on pulsed transmission, it is often recommended by manufacturers that a boat speed be kept below 7 knots (kn) to avoid missing underwater targets. However, a ship speed may often exceed 30 kn, therefore the ship is required to slow down in order to accurately use the sonar system. This limitation has constrained the practical application of side scan sonar technology in boats and ships that travel at faster speeds.

A synthetic aperture side scan sonar is disclosed in EP0199571, for example. Synthetic aperture side scan sonar technology synthesizes multiple reception signals for each line in an image. However, the processing power required increases manufacturing costs and complexity for such devices.

SUMMARY

To address the above described challenges, a Continuous Transmission Frequency Modulated (CTFM) detection apparatus is provided for installation on a boat or a ship. The CTFM detection apparatus comprises a projector, a sensor, and a hardware processor. The projector is configured to transmit, underwater, a frequency modulated transmission wave based on a transmission signal. The sensor is configured to form a reception beam directed downward and laterally outward to a side of the boat or the ship and receive a reflected wave. The reflected wave comprises a reflection of the transmission wave on a target object. The hardware processor is operatively coupled to the projector and sensor. The hardware processor is programmed to at least generate a beat signal based at least in part on the transmission signal and the reflected wave, extract a processing signal from the beat signal, and generate an image information related to the target object based on the extracted processing signal.

Further in this aspect, the projector may be configured to repeatedly transmit the frequency modulated transmission wave at a particular repetition rate. Additionally, the hardware processor may be further programmed to at least repeatedly extract the processing signal at a particular extraction rate, so that the particular extraction rate is faster than the repetition rate of the transmission wave.

Further in this aspect, the hardware processor may be further programmed to at least acquire a velocity of the boat or the ship, and adjust the extraction rate based at least in part on the velocity.

Further in this aspect, the hardware processor may be further programmed to at least increase the extraction rate as the velocity increases.

Further in this aspect, the hardware processor may be further programmed to at least acquire a velocity of the boat or the ship, and extract the processing signal so that the processing signal has a duration, the duration being based at least in part on the velocity.

Further in this aspect, the hardware processor may be further programmed to at least increase the duration as the velocity increases.

Further in this aspect, the hardware processor may be further programmed to at least acquire a velocity of the boat or the ship and extract the processing signal so that the processing signal has a duration, and adjust the extraction rate and the duration based at least in part on the velocity.

Further in this aspect, the transmission wave transmitted by the projector may form a transmission beam directed downward and laterally outward to said side of the boat or the ship. The transmission beam may have a particular transmission beam width in a longitudinal direction of the boat or ship. In addition, the reception beam may have a particular reception beam width in the longitudinal direction of the boat or ship, with the transmission beam width being wider than the reception beam width.

Further in this aspect, the CTFM detection apparatus may further comprise a second sensor configured to form a second reception beam directed downward and laterally outward to a second side of the boat or ship and receive a second reflected wave. The second reflected wave may comprise a reflection of the transmission wave. The transmission wave transmitted by the projector may form a transmission beam directed downward and laterally outward to both said side of the boat or ship and said second side of the boat or ship. Additionally, the hardware processor may be further programmed to at least generate a second beat signal based at least in part on the transmission signal and the second reflected wave and generate a second image information based on an extracted second processing signal extracted from the second beat signal.

Further in this aspect, the transmission beam may have a particular transmission beam width in a longitudinal direction of the boat or ship, the reception beam may have a particular reception beam width in the longitudinal direction of the boat or ship, and the second reception beam may have a particular second reception beam width in the longitudinal direction of the boat or ship. Furthermore, the transmission beam width may be wider than the reception beam width and the second reception beam width.

Further in this aspect, the CTFM detection apparatus may further comprise a display, operatively coupled to the hardware processor, configured to display the image information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, an underwater detection apparatus according to selected embodiments of this disclosure are described with reference to the accompanying drawings. It will be apparent to those skilled in the art from this disclosure that the following descriptions of the embodiments of the invention are provided for illustration only and not for the purpose of limiting the invention as defined by the appended claims and their equivalents.

Figure 1:
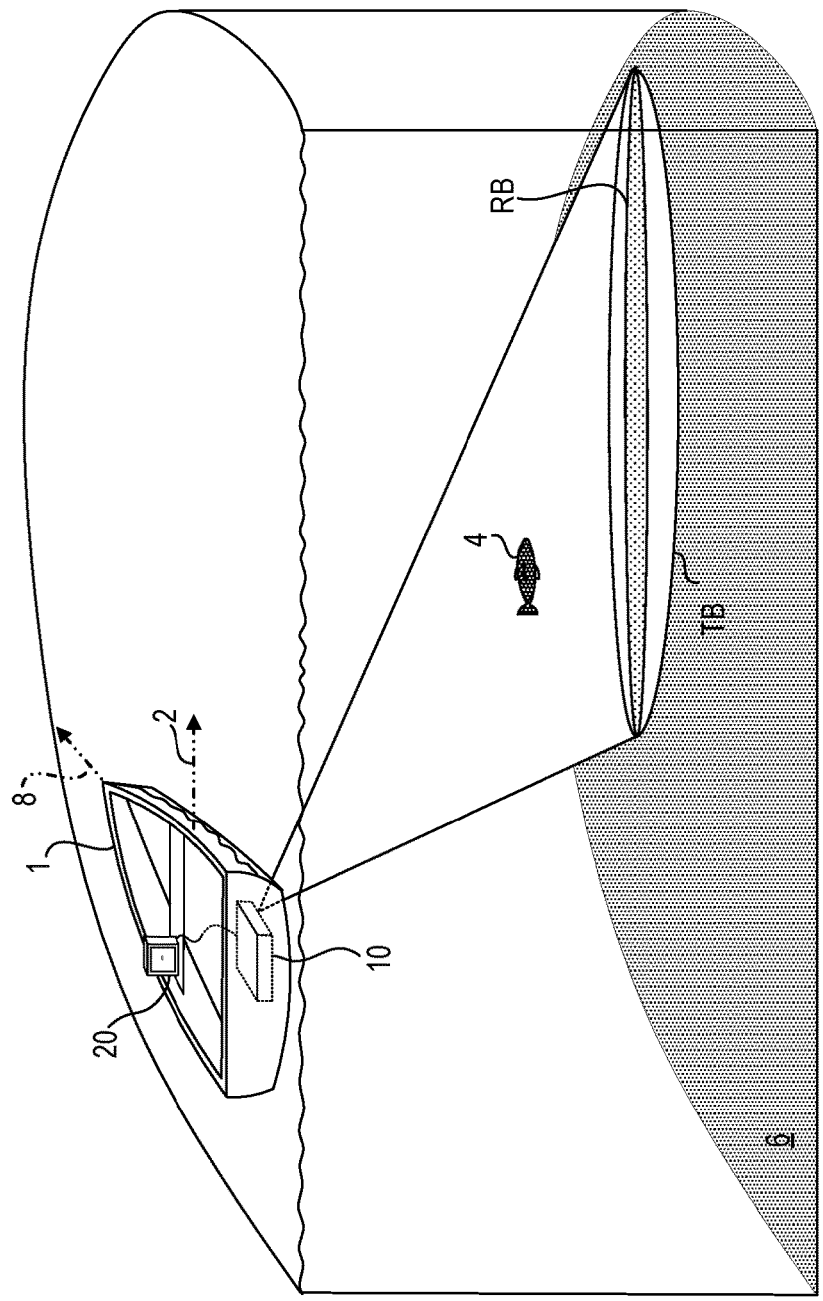
FIG. 1 is a schematic illustrating a system for detecting a target object by a CTFM detection apparatus, illustrated with a boat on which the CTFM detection apparatus is mounted.

Referring initially to FIG. 1, a boat or ship 1 is illustrated to include a side scan type underwater detection apparatus 10. The side scan type underwater detection apparatus 10 is mounted or coupled to the bottom of the boat or ship 1, to face a side 2 of the boat 1, and used primarily for detecting target objects 4. This configuration is shown, for example, in FIG. 1 with the side scan type underwater detection apparatus 10 mounted to a fishing boat and detecting fish, but may also be used for detecting undulations of a water bottom 6, such as a rock reef, or structural objects, such as an artificial fish reef. A longitudinal direction 8 of the boat 1 is substantially orthogonal to the side 2 of the boat 1 and parallel to a direction of travel of the boat 1. Furthermore, the underwater detection apparatus 10 of this disclosure is a Continuous Transmission Frequency Modulated (CTFM) detection apparatus 10 designed to be installed on the boat or ship 1.

Figure 2:
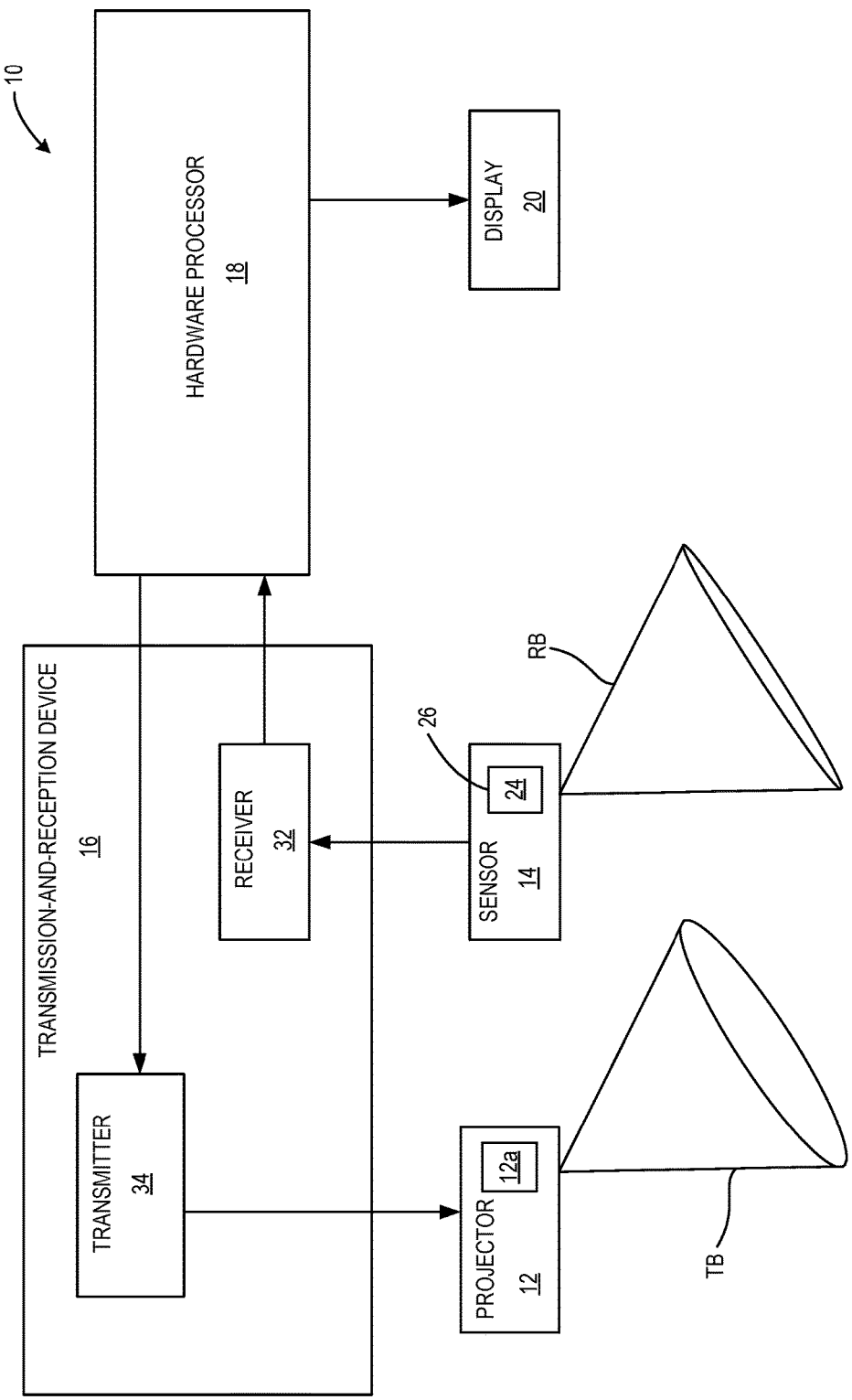
FIG. 2 is a block diagram illustrating a configuration of a CTFM detection apparatus according to an embodiment of this disclosure.

Referring to FIG. 2, a block diagram illustrates a configuration of the CTFM detection apparatus 10 according to a first embodiment of the disclosure. As illustrated in FIG. 2, the CTFM detection apparatus 10 comprises a projector 12 (which may also be referred to as a transmitting part of a transducer), a sensor 14, a transmission-and-reception device 16, a hardware processor 18, and a display 20.

The projector 12 is configured to transmit an ultrasonic wave underwater as a frequency modulated transmission wave 22, and is fixed to the bottom of the ship 1 so that a transmitting surface 12a from which the ultrasonic transmission wave 22 is transmitted is exposed to the water. In this embodiment, the transmitting surface 12a is formed into an oblong rectangular shape with its longest dimension oriented parallel to the longitudinal direction 8 of the boat or ship 1. Thus, the projector 12 of this embodiment is capable of transmitting a 3-dimensional transmission beam TB over a comparatively wide range, allowing the transmission beam TB to cover a wide range. The transmission beam TB has, for example, a conical shape extending downward and laterally outward with the vertex at the projector 12. As seen in FIG. 1, the footprint of the conical shape on the seabed is elongated in a direction to the side 2 of the boat or ship 1 and thin in the longitudinal direction 8, therefore the opening angle of the conical shape is not the same in all directions. For example, the opening angle of the conical shape in the direction to the side 2 of the boat or ship 1 is about 80°. However, this disclosure is not limited as such, and the opening angle may be less than or greater than 80°. For example, the angle may be between 30° and 85°.

Figure 3:
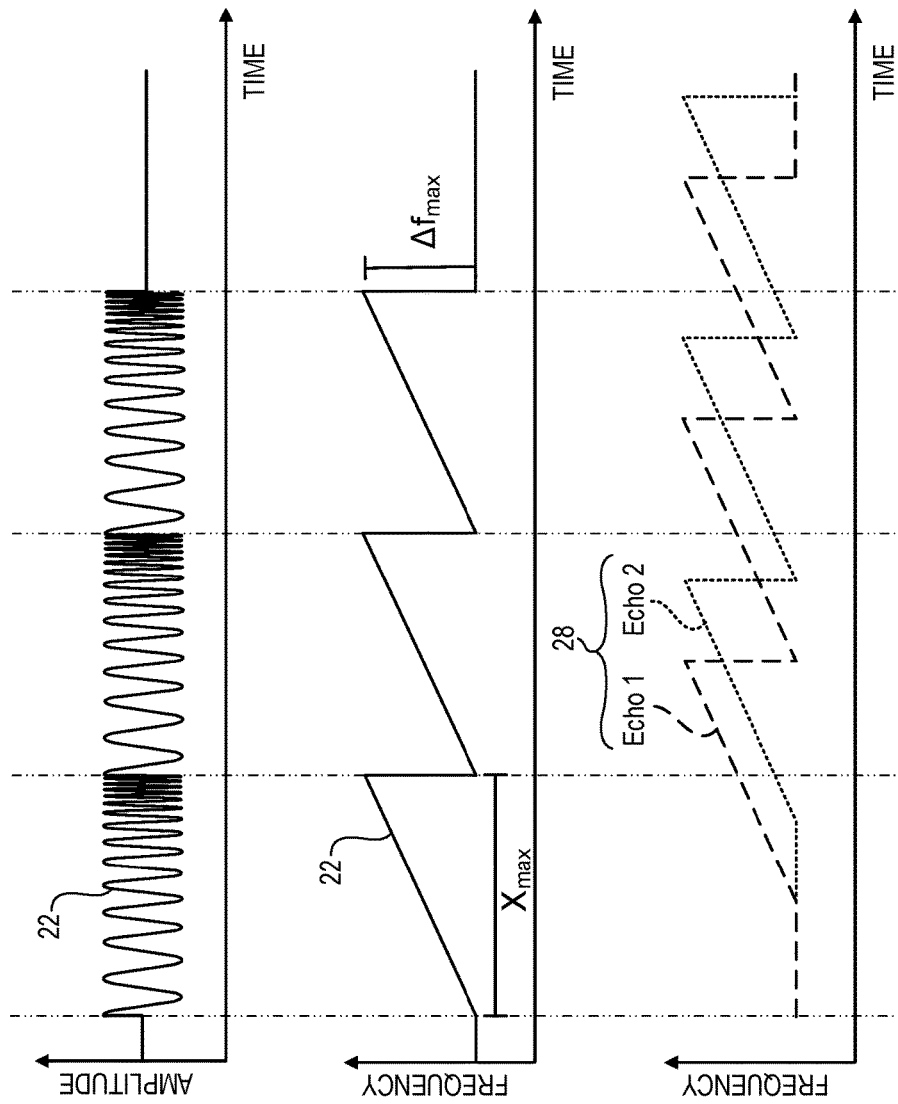
FIG. 3 is a chart illustrating a relationship between time and amplitude of an ultrasonic wave transmitted by a projector, a chart illustrating a relationship between time and frequency of the ultrasonic wave, and a chart illustrating a relationship between time and frequency of two echoes of the ultrasonic wave detected by a sensor of a CTFM detection apparatus.

Further, the frequency modulated transmission wave 22 transmitted from the projector 12 may be a chirp wave in which frequency gradually changes with time. The top chart in FIG. 3 illustrates a relationship between time and amplitude of the transmission wave 22 transmitted from the projector 12, and the middle chart in FIG. 3 illustrates a relationship between time and frequency of the transmission wave 22. In FIG. 3, $X_{max}$ is a sweeping period indicating the time required to transmit one cycle of the chirp wave, and $\Delta f_{max}$ is a sweeping bandwidth indicating the total frequency range of the transmission wave 22.

The transmission-and-reception device 16 includes a receiver 32 and a transmitter 34. Specifically, the transmitter amplifies a frequency modulated transmission signal 36 generated by the hardware processor 18 to obtain a high-voltage transmission signal 36 and applies the high-voltage transmission signal 36 to the projector 12. The projector 12 is configured to transmit the frequency modulated transmission wave 22 based on the transmission signal 36 received from the transmitter 34.

In the above embodiment, the frequency modulated transmission wave 22 is continuously transmitted by the projector 12; however, without limiting to this, a frequency modulated pulse wave having a pulse width corresponding to a time period longer than that of a round-trip propagation of the detection range by the ultrasonic wave may be transmitted by the projector 12.

As shown in FIG. 2, the sensor 14 has one or more ultrasonic transducers 24 (in this embodiment, one), which may also be referred to as a receiving element. The sensor 14 is configured to form a reception beam RB directed downward and laterally outward to a side 2 of the boat or the ship 1 and receive a reflected wave 28, the reflected wave 28 comprising a reflection of the transmission wave 22 on a target object 4, the reflection corresponding to an echo of the transmission wave 22. The sensor 14 may receive many reflected waves 28 as echoes, each echo corresponding to the reflection of the transmission wave 22 on a different target object 4. The bottom chart in FIG. 3 illustrates a relationship between time and frequency of, for example, two reflected waves 28, along with their temporal relationships to the transmission wave 22.

Figure 4A:
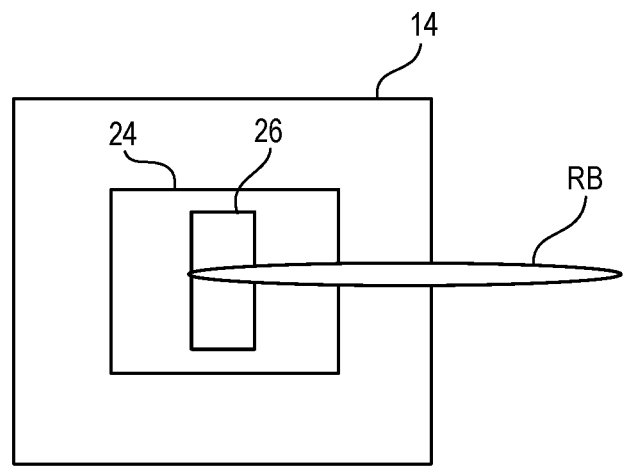
FIG. 4A is a bottom view schematically illustrating an ultrasonic transducer of a CTFM detection apparatus along with a shape of a reception beam formed by the ultrasonic transducer.
Figure 4B:
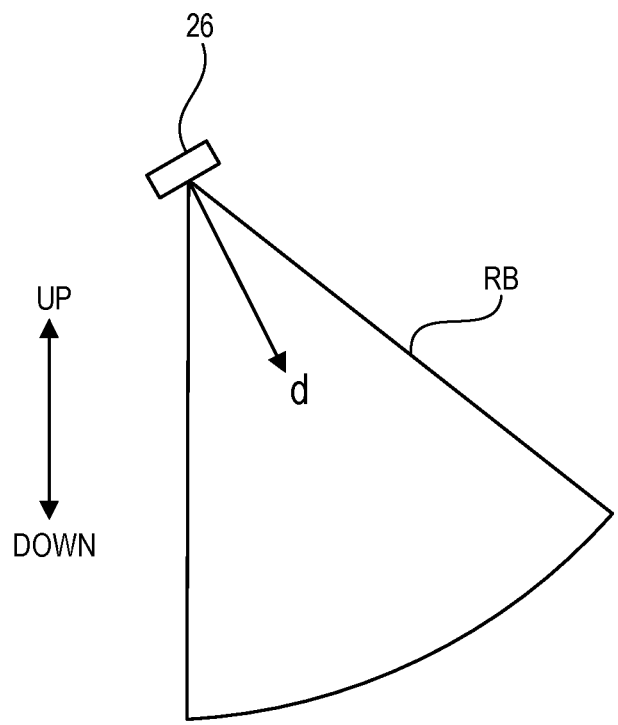
FIG. 4B is a side view schematically illustrating the ultrasonic transducer with the shape of the reception beam formed by the ultrasonic transducer in FIG. 4A.

Referring now to FIGS. 4A and 4B, the sensor 14 is described in more detail. The ultrasonic transducer 24 of the sensor 14 has a receiving surface 26 exposed to the water, where the reflected wave 28 is received. The ultrasonic transducer 24 receives the reflected wave 28 of the frequency modulated transmission wave 22 transmitted by the projector 12, and converts the reflected wave 28 into an electric signal (e.g. a received signal) 30. It will be noted that the illustration of the other parts of the ultrasonic transducer 24, besides the receiving surface 26, are omitted in FIG. 4A.

FIG. 4A is a bottom view of the sensor 14 schematically illustrating the ultrasonic transducer 24 from FIG. 2, along with shape of a reception beam RB formed by the ultrasonic transducer 24. The receiving surface 26 is formed into an oblong rectangular shape in a plan view (when seen from below), allowing the reception beam RB to be suitably formed.

Thus, as illustrated in FIG. 4A, the ultrasonic transducer 24 generates the reception beam RB having a fan shape spreading along a surface perpendicular to the longitudinal direction of the receiving surface 26. The reception beam RB is, for example, comparatively thin, as thin as or thinner than about 6°. Note that, the thickness of the reception beam RB corresponds to the width of the beam in the longitudinal direction 8 of the boat or ship 1, where the sensor 14 is mounted to the boat or ship 1 so that a longest dimension of the receiving surface 26 is oriented parallel to the longitudinal direction 8 of the boat or ship 1.

The receiving surface 26 is arranged to face downward and laterally outward. Specifically, as shown in FIG. 4B, the receiving surface 26 is arranged so that the receiving surface 26 extends perpendicular to direction d, inclining with respect to the vertically downward direction. Note that hereinafter, a beam axis of the reception beam is an axis within the reception beam and extending in a direction where the highest reception sensitivity is obtained.

The sensor 14 transmits the converted received signal 30 to a receiver 32 of the transmission-and-reception device 16. The receiver 32 amplifies the electric signal (received signal) 30 output by the sensor 14, and A/D converts the amplified received signal 30. Then, the receiver 32 outputs the received signal, converted into a digital signal, to the hardware processor 18. Specifically, the receiver 32 has a receive circuit (not illustrated) that performs the processing described above on the received signal obtained by electroacoustically converting the reflected wave 28 received by the ultrasonic transducer 24, and outputs the processed received signal 30 to the hardware processor 18.

Figure 5:
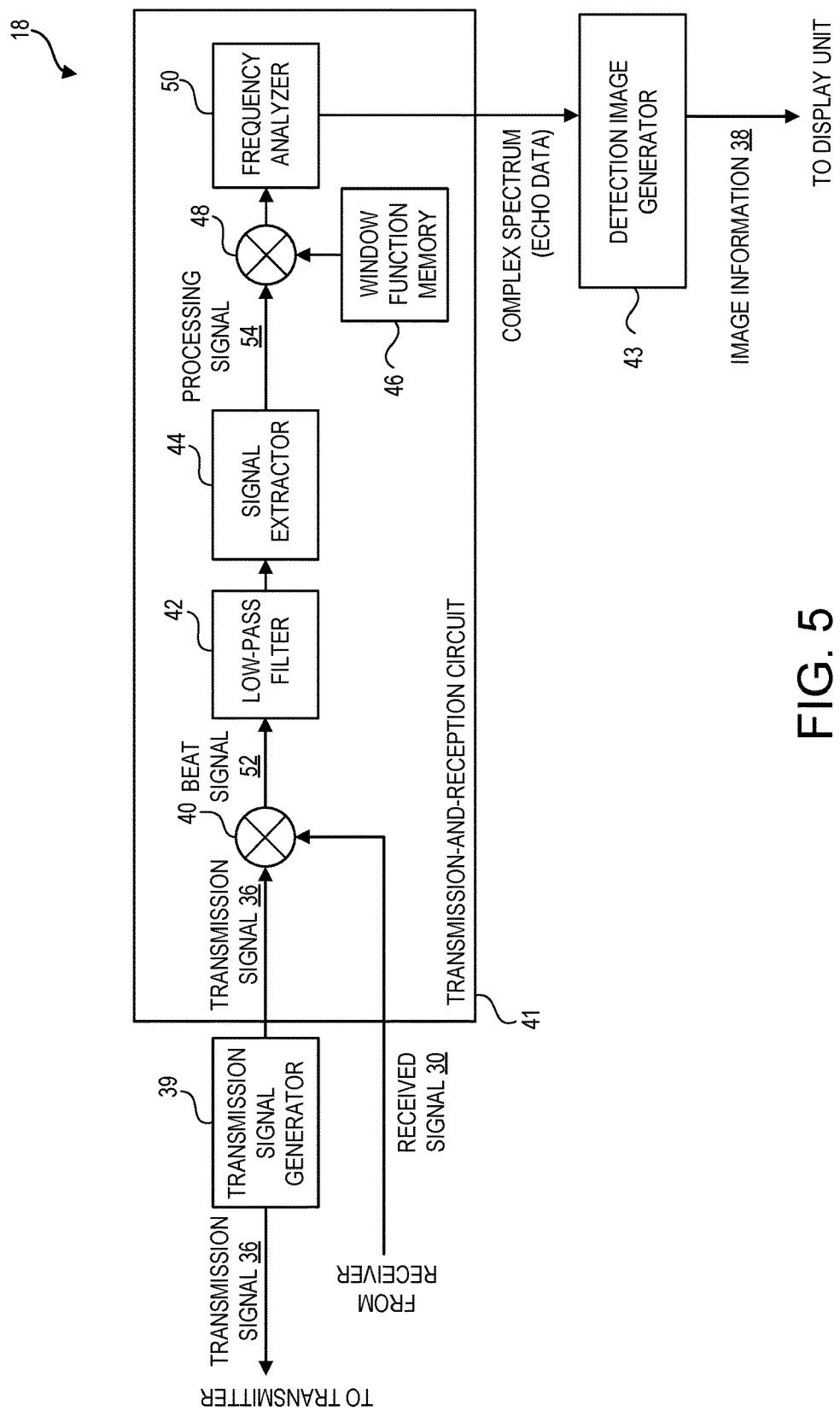
FIG. 5 is a block diagram illustrating a configuration of a hardware processor of an embodiment of a CTFM detection apparatus.

FIG. 5 is a block diagram illustrating a configuration of the hardware processor 18. As shown in FIG. 5, the hardware processor 18 is operatively coupled to the projector 12 and the sensor 14 via the transmission-and-reception device 16. The hardware processor 18 generates the transmission signal 36 (electric signal) and inputs it to the transmitter 34. Further, the hardware processor 18 processes the received signal 30 outputted by the receiver 32 to generate image information 38 of the target object 4. The configuration of the hardware processor 18 is described below in detail.

As illustrated in FIG. 5, the hardware processor 18 includes a transmission signal generator 39, a transmission-and-reception circuit 41, and a detection image generator 43. The transmission signal generator 39, the transmission-and-reception circuit 41 and the detection image generator 43 are, for example, implemented on the hardware processor 18 (which is a logic processor such as a CPU, ASIC, FPGA, etc.) using portions of a non-volatile memory (not shown) and volatile memory (not shown). For example, by having the hardware processor 18 read a program from the non-volatile memory and execute the program using portions of the volatile memory, it is possible to implement the functions of the transmission signal generator 39, the transmission-and-reception circuit 41, and the detection image generator 43.

The transmission signal generator 39 generates the transmission signal 36 (electric signal), which is the basis of the transmission wave 22 transmitted by the projector 12. The transmission signal 36 generated by the transmission signal generator 39 is transmitted to the transmitter 34 and the transmission-and-reception circuit 41.

The transmission-and-reception circuit 41 receives the transmission signal 36 generated by the transmission signal generator 39 and the received signal 30 generated by the corresponding receive circuit (the received signal obtained by the ultrasonic transducer 24 and amplified by the receiver 32). The transmission-and-reception circuit 41 includes a first multiplier 40, a low-pass filter 42, a signal extractor 44, a window function memory 46, a second multiplier 48, and a frequency analyzer 50.

Figure 6A:
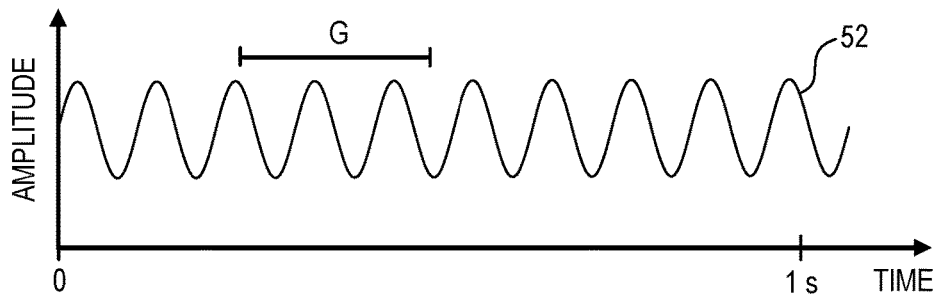
FIG. 6A is a chart of one example of a relationship between time and amplitude of a beat signal generated by a first multiplier of a CTFM detection apparatus.

The hardware processor 18 is programmed to, at least, generate a beat signal 52 based, at least in part, on the transmission signal 36 and the reflected wave 28, extract a processing signal 54 from the beat signal 52, and generate the image information 38 related to the target object 4 based on the extracted processing signal 54. Specifically, the first multiplier 40 generates the beat signal 52 based on the transmission signal 36 generated by the transmission signal generator 39 and the received signal 30 obtained from the ultrasonic waves received by the ultrasonic transducer 24. The first multiplier 40 combines (e.g., mixes or multiplies) the transmission signal 36 with the received signal 30 described above to generate the beat signal 52. FIG. 6A is a chart illustrating the relationship between time and amplitude of one example of the beat signal 52 generated by the first multiplier 40.

In the above embodiment, the combining of the transmission signal 36 with the received signal 30 is performed as digital signal processing; however, it may be performed as analog signal processing. In this case, the first multiplier 40 is disposed in the transmission-and-reception device 16 instead of the hardware processor 18, and the combining described above is performed before the received signal 30 is A/D converted by the receiver 32.

The low-pass filter 42 removes an unrequired signal component (which is typically a high frequency component) from the beat signal 52 generated by the first multiplier 40.

The signal extractor 44 extracts a processing signal 54, from within a section of the beat signal 52 with the unrequired signal component removed by the low-pass filter 42, so as to process the processing signal 54 in a post process. Specifically, the signal extractor 44 sets the section to be processed to be a reception gate section G, and sets the beat signal 52 within the reception gate section G to be the processing signal 54. Referring to FIG. 6A, the generation of the processing signal 54 is described. FIG. 6A illustrates a waveform of the beat signal 52 output from the low-pass filter (i.e., a waveform before the processing signal 54 is extracted), with an example reception gate section G used to extract the processing signal from the beat signal 52 in FIG. 6A. Mechanisms of processing signal 54 extraction will be described later in more detail.

With the CTFM detection apparatus 10 of the present disclosure, gating of the beat signal 52 by the signal extractor 44 determines a refresh rate of an echo of the frequency modulated transmission wave 22. Since the frequency modulated transmission wave 22 is continuously transmitted, the echo from target objects 4 at all distances within a particular detection range will continuously come back, allowing the reception gate section G to be shorter than the time period for a round-trip propagation of a single ultrasonic pulse, as is required by the pulse echo method. Thus, the echo can be obtained in a comparatively short time period with the CTFM detection apparatus 10, and, as a result, the time period for detecting a target object 4 at a particular range can be shortened.

Referring again to FIG. 5, the window function memory 46 stores a particular window function. Further, the second multiplier 48 multiplies the processing signal 54 by the particular window function stored in the window function memory 46. However, the present disclosure is not limited to a CTFM detection apparatus 10 having a hardware processor 18 with a window function memory 46, the window function memory 46 and the second multiplier 48 may be omitted from the configuration of the hardware processor 18. Thus, deterioration of a resolution of a main lobe can be suppressed.

The frequency analyzer 50 analyzes the output result from the second multiplier 48 (the processing signal 54 multiplied by the window function) and generates echo data indicating an amplitude and a phase (amplitude spectrum and phase spectrum; hereinafter, they may comprehensively be referred to as the complex spectrum) at each frequency. Examples of the analyzing method include a Discrete Fourier Transform (DFT) and a Fast Fourier Transform (FFT). Note that, by multiplying the processing signal by the window function as described above, side lobes of the complex spectrum generated by the frequency analyzer 50 can be reduced.

The detection image generator 43 converts a horizontal axis of the complex spectrum generated by the transmission-and-reception circuit 41 from a frequency into a distance (e.g. a distance from the ship) to generate image information 38 (complex amplitude data of the echo at each distance from the ship). A coefficient for the conversion from the frequency into the distance may be calculated to perform the conversion based on the sweeping bandwidth $\Delta f_{max}$ of the transmission signal 36, the sweeping time period $X_{max}$ of the transmission signal 36, and the underwater sound speed. The detection image generator 43 continuously updates (i.e., refreshes) the image information 38 and outputs the image information 38 to be displayed as an image on the display 20.

The display 20 is operatively coupled to the hardware processor 18 and configured to display, on a display screen, an image corresponding to the image information 38 outputted by the hardware processor 18. In this embodiment, the display 20 displays an underwater state on a side 2 of the ship 1 on a display 20. Thus, a user can estimate the underwater state on a side 2 of the ship 1 (e.g., a single fish or a school of fish, undulation of the water bottom 6, whether a structural object such as an artificial fish reef exists, and a position thereof) by looking at the display screen. It is to be noted that instead of connecting directly to the detection image generator 43, the display 20 may be a remote display connected to the detection image generator 43 through a network. In such configuration, the detection image generator 43 outputs the image information 38 to the network and the remote display connected to the network retrieves the image information 38 from the network.

[Processing Signal Extraction]

Although a first embodiment of this disclosure is described above, this disclosure is not limited thereto, and may be modified in various forms without deviating from the scope of this disclosure. Further, additional embodiments are described below.

Figure 6B:
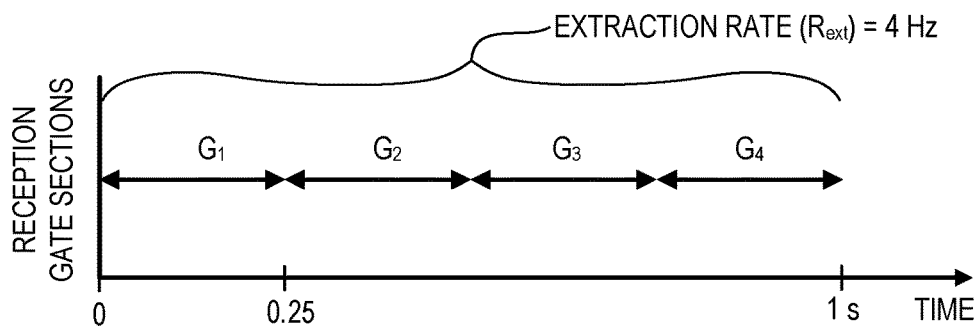
FIG. 6B is a chart illustrating of one example of non-overlapping reception gate sections having an extraction rate according to a second embodiment of the present disclosure.

Referring to FIG. 6B, a second embodiment of the CTFM detection apparatus 10 configured to implement a modified method for extracting the processing signal 54 is described. The projector 12 of the CTFM detection apparatus 10 of the second embodiment, may be further configured to repeatedly transmit the frequency modulated transmission wave 22 at a particular repetition rate $R_{rep}$. The particular repetition rate $R_{rep}$ is the number of transmission wave 22 cycles that occur in a given period of time ($R_{rep}$=transmission wave cycles/time). Furthermore, the signal extractor 44 of the hardware processor 18 may be programmed to repeatedly extract the processing signal 54 at a particular extraction rate $R_{ext}$, where the particular extraction rate $R_{ext}$ is faster than the repetition rate $R_{rep}$ of the transmission wave 22 ($R_{ext} > R_{rep}$).

Since the CTFM detection apparatus 10 of the second embodiment is generally similar to that of the other embodiments, with the exception particular repetition rate $R_{rep}$ of the transmission wave 22 and the particular repetition rate $R_{ext}$ of the processing signal 54, detailed description thereof is abbreviated here for the sake of brevity. The configuration of the second embodiment may also incorporate aspects of any of the other embodiments of the present disclosure. It is to be noted that no parts have alternate structure in this embodiment, so all parts are designated by the same reference numerals as the first embodiment throughout the detailed description and the accompanying drawings.

When the extraction rate $R_{ext}$ of the beat signal 52 is made faster, the refresh rate of the echo of the frequency modulated transmission wave 22 may be improved. However, since a shortened reception gate section G of the beat signal 52 contains a smaller frequency range than that of the full sweeping bandwidth of the transmission wave 22 sweeping period $X_{max}$, improving the refresh rate comes at the cost of decreasing the frequency resolution and the signal-to-noise ratio of the processing signal 54. For this reason, it is desirable to avoid unnecessarily increasing the extraction rate $R_{ext}$ and shortening the reception gate sections G, in part because the processing signals 54 with larger frequency ranges generally achieve better distance resolutions.

The advantage of increasing the extraction rate $R_{ext}$, and therefore the refresh rate of the received signal 30, depends on a velocity of the boat or ship 1. For example, at low boat speeds, it is not advantageous to have a high extraction rate $R_{ext}$ since the distance resolution may be decreased. However, at high boat speeds the same extraction rate may limit the ability of the CTFM detection apparatus 10 to distinguish equidistant target objects 4. Therefore, the hardware processor of the CTFM detection apparatus 10 of the second embodiment may be further programmed to acquire the velocity of the boat or ship 1, and adjust the extraction rate $R_{ext}$ based at least in part on the velocity. Specifically, the hardware processor may be programmed to increase the extraction rate as the velocity increases.

One example is shown in the Table below, in which two target objects 4 (one that is 100 meters away and another that is 10 meters away) are being detected with a reception beam RB having a reception beam width of 1 degree. In this example, if the velocity of the boat 1 is set to 2.3 kn, then the extraction rate $R_{ext}$ is set to 7.67 Hz; if the velocity of the boat 1 is set to 3.5 kn, then the extraction rate $R_{ext}$ is set to 15.3 Hz; and if the velocity of the boat 1 is set to 7 kn, then the extraction rate is set to 23 Hz. By increasing the frequency with which the beat signal 52 is extracted as the velocity of the boat or ship 1 increases, the CTFM detection apparatus 10 may improve the refresh rate of the echo of the frequency modulated transmission wave 22, and allows the CTFM detection apparatus 10 to acquire high-resolution images of target objects 4, even at increased boat speeds.

| Boat Velocity (kn) | Extraction Rate (Hz) | Refresh Rate Improvement Factor |
|---|---|---|
| 2.3 | 7.67 | 1 |
| 3.5 | 15.3 | 2 |
| 7 | 23 | 3 |

Figure 6C:
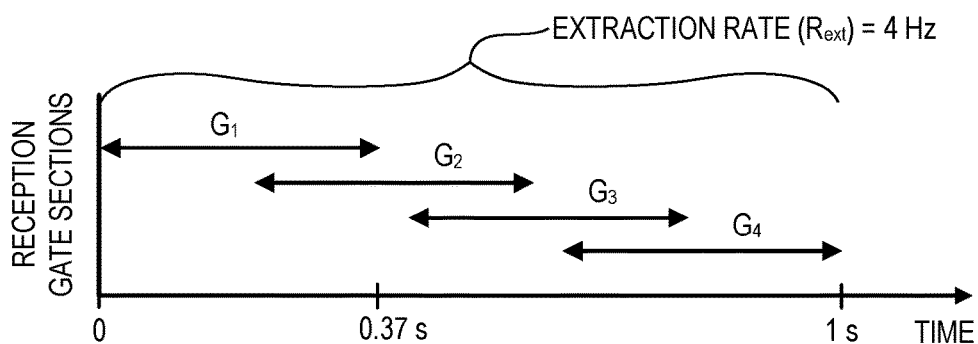
FIG. 6C is a chart illustrating of one example of overlapping reception gate sections having the same extraction rate as the reception gate sections from FIG. 6B, but having a longer duration than the reception gate sections depicted in FIG. 6B, according to a third embodiment of the present disclosure.

Referring now to FIG. 6C, a third embodiment of the CTFM detection apparatus 10 with a modified method for extracting the processing signal 54 is discussed. Similar to the second embodiment, in the third embodiment of the CTFM detection apparatus 10, the projector 12 may be configured to repeatedly transmit the frequency modulated transmission wave 22 at a particular repetition rate $R_{rep}$, where the particular repetition rate $R_{rep}$ is the number of transmission wave 22 cycles that occur in a given period of time ($R_{rep}$=transmission wave cycles/time). Furthermore, the signal extractor 44 of the hardware processor 18 may be programmed to repeatedly extract the processing signal 54 at a particular extraction rate $R_{ext}$, where the particular extraction rate $R_{ext}$ is faster than the repetition rate $R_{rep}$ of the transmission wave 22 ($R_{ext}$>$R_{rep}$).

Additionally, the hardware processor 18 of the third embodiment of the CTFM detection apparatus 10 may be further programmed to acquire at least a velocity of the boat or the ship 1, and extract the processing signal 54 so that the processing signal 54 has a duration, the duration being based at least in part on the velocity. A longer duration (length) of the processing signal 54 increases the frequency resolution and the signal-to-noise ratio of the processing signal 54. This increase in the frequency resolution and the signal-to-noise ratio of the processing signal 54 results in an increased resolution of the image information 38 output by the hardware processor 18. Since an increased signal-to-noise ratio of the processing signal 54 has the effect of enhancing the resolution of the image information 38, it may be preferred to extract the beat signal 52 with the longest possible reception gate section G. However, if increasing the duration of the processing signal 54 results in a decrease of the extraction rate $R_{ext}$ of the processing signal, the opposite effect may occur, and the image information 38 output by the hardware processor 18 may have decreased resolution.

Since the CTFM detection apparatus 10 of the third embodiment is generally similar to that of the other embodiments, with the exception particular repetition rate $R_{rep}$ of the transmission wave 22, the particular repetition rate $R_{ext}$ of the processing signal 54, and the duration of the processing signal 54, detailed description thereof is abbreviated here for the sake of brevity. The configuration of the third embodiment may also incorporate aspects of any of the other embodiments of the present disclosure. It is to be noted that no parts have alternate structure in this embodiment, so all parts are designated by the same reference numerals as the first embodiment throughout the detailed description and the accompanying drawings.

In the present embodiment, it is preferred to increase the duration of the processing signal 54 without changing the extraction rate $R_{ext}$. An illustrative example can be seen in FIG. 6C, when compared to the configuration shown in FIG. 6B. The duration of the reception gate sections $G_{1, 2, 3, \& 4}$ in FIG. 6C are longer than the duration of the reception gate sections $G_{1, 2, 3, \& 4}$ in FIG. 6B, however the extraction rate $R_{ext}$ does not change. This is made possible by extracting the processing signal 54 via either non-overlapping (FIG. 6B) or overlapping (FIG. 6C) reception gate sections $G_{1, 2, 3, \& 4}$. In these examples, the duration of the processing signal 54 is increased from 0.25 s (FIG. 6B) to 0.37 s (FIG. 6C), while the extraction rate $R_{ext}$ is kept constant at 4 Hz. If the signal extractor 44 may extract processing signals 54 from the beat signal 52 (for example the beat signal 52 shown in FIG. 6A) using the overlapping reception gate sections $G_{1, 2, 3, \& 4}$ shown in FIG. 6C, the extracted processing signal will have the same refresh rate but an increased frequency bandwidth relative to the configuration shown in FIG. 6B.

An increased velocity of a boat or ship 1 can cause an engine of the boat or ship 1 to produce increased noise, resulting in a decrease of the signal-to-noise ratio of the processing signal 54. For this reason, it may be advantageous to increase the duration of the processing signal 54 as the velocity of the boat or ship 1 increases. Thus, the hardware processor 18 may be further programmed to at least increase the duration of the processing signal 54 as the velocity increases. However, the present disclosure is not limited to changing the duration of the processing signal 54 as the velocity changes, and may also change the duration of the processing signal 54 in response to changes in background noise caused by other factors, such as, for example, turning the engine on or off.

Furthermore, it should be obvious that, in addition to changing the duration of the processing signal 54 while keeping the extraction rate $R_{ext}$ constant, the duration of the processing signal 54 and the extraction rate $R_{ext}$ may also vary simultaneously. Therefore, the hardware processor may be further programmed to at least acquire a velocity of the boat or the ship, extract the processing signal so that the processing signal has a duration, and adjust the extraction rate and the duration based at least in part on the velocity.

[Transmission and Reception Beam Configurations]

In any of the embodiments described herein, the frequency modulated transmission wave 22 transmitted by the projector 12 may form a transmission beam TB directed downward and laterally outward to the side 2 of the boat or the ship 1. The transmission beam TB may have a particular transmission beam width $W_{TB}$ in a longitudinal direction 8 of the boat or ship 1 and the reception beam RB may have a particular reception beam width $W_{RB}$ in the longitudinal direction 8 of the boat or ship 1.

Figure 7A:
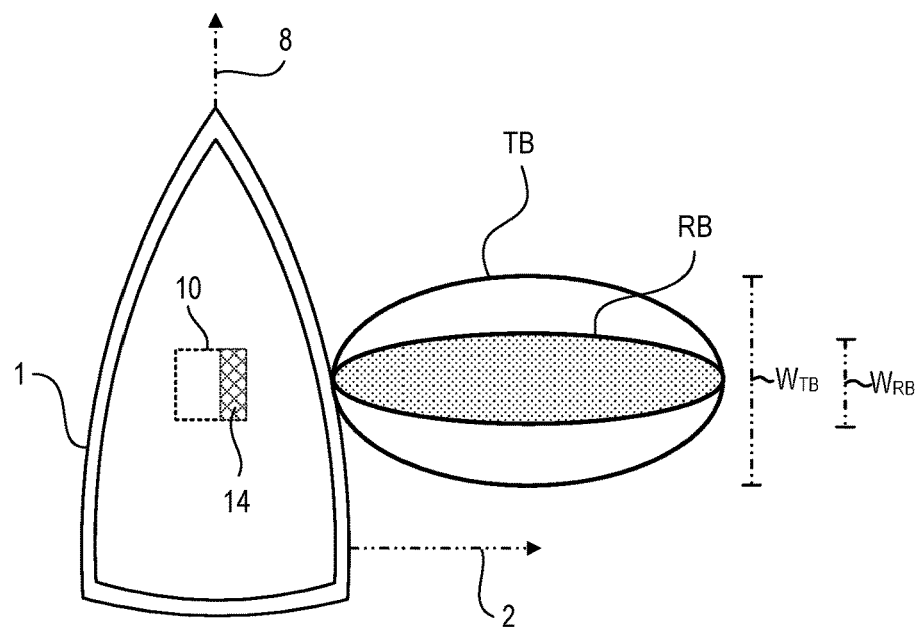
FIG. 7A is a top view according to one configuration of a transmission beam and a reception beam formed by a CTFM detection apparatus, illustrated with the boat on which the CTFM detection apparatus is mounted.

In the CTFM detection apparatus 10 of the present disclosure, since the refresh rate of the echo of the frequency modulated transmission wave 22 is preferentially faster than the round-trip propagation time of a single ultrasonic pulse, it is necessary for the transmission beam width $W_{TB}$ to be wider than the reception beam width $W_{RB}$. Therefore, the transmission beam width $W_{TB}$ may also be configured to be wider than the reception beam width $W_{RB}$. As shown in FIG. 7A, the transmission beam TB may be wider than the reception beam RB both in a front and back of the reception beam RB, where the front is toward a direction of travel in the longitudinal direction 8 and the back is away from the direction of travel. The following equation may be used to determine the optimum ratio between the reception beam width $W_{RB}$ and the transmission beam width $W_{TB}$:

$(W_{TB}/W_{RB}) \geq 2 \times$(ultrasonic pulse round-trip propagation time×refresh rate)

Figure 7B:
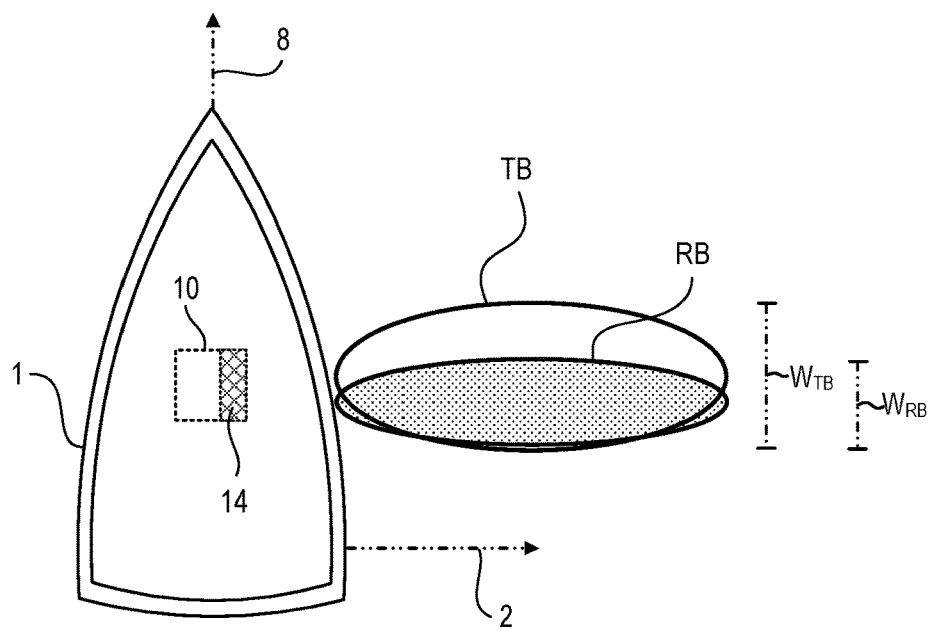
FIG. 7B is a top view according to a second configuration of a transmission beam and a reception beam formed by a CTFM detection apparatus, illustrated with the boat on which the CTFM detection apparatus is mounted.
Figure 8:
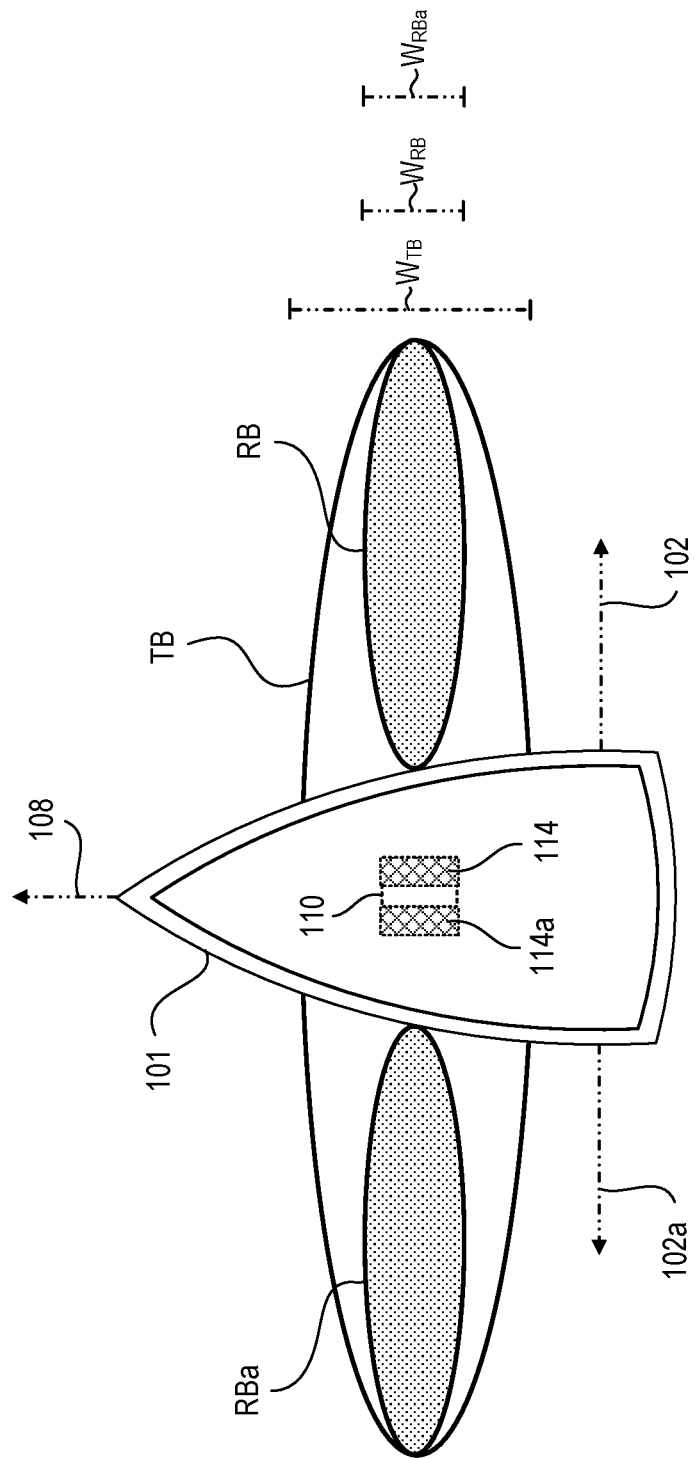
FIG. 8 is a top view of a transmission beam and multiple reception beams formed by a CTFM detection apparatus according to a fourth embodiment of the present disclosure, illustrated with the ship on which the CTFM detection apparatus is mounted.

Referring now to FIG. 7B, an alternate configuration of the transmission beam TB and reception beam RB is shown. At a fast boat or ship 1 velocity the transmission beam TB may be wider than the reception beam RB only to the front of the reception beam RB. In this configuration, the transmission beam width $W_{TB}$ may be configured to be narrower without altering the required refresh rate or the reception beam width $W_{RB}$. By making the required width of the transmission beam TB narrower, the factor of 2 may be removed from the equation to determine the optimum ratio between the reception beam width $W_{RB}$ and the transmission beam width $W_{TB}$:

$(W_{TB}/W_{RB}) \geq$(ultrasonic pulse round-trip propagation time×refresh rate)

This has the potential advantage of reducing a required size of the transmission beam TB, and therefor also reducing a transmission power level of the transmission beam TB, thus saving energy.

Based on these equations, the optimum range of reception beam widths $W_{RB}$ is found to be between 0.5° and 3° in the longitudinal direction 8 for a boat or ship 1 traveling at 7 kn, with a transmission beam width $W_{TB}$ of 6° for the configuration shown in FIG. 7A, or 3° for the configuration shown in FIG. 7B. For example, with a reception beam width $W_{RB}$ of 3° in the longitudinal direction 8 of the boat 1, if the target object 4 is 100 m away, the CTFM detection apparatus 10 will be able to identify objects 5 m in size. This object resolution is ideal for the identification of seabed structures on a water bottom 6, such as a reef. Additionally, if the reception beam width $W_{RB}$ is reduced to 0.5° in the longitudinal direction 8 of the boat 1, the CTFM detection apparatus 10 of the present disclosure can identify objects as small as 50 cm. This higher object resolution may be ideal for the identification of smaller target objects 4, such as fish.

[Dual Side Scan Sonar Sensors]

Referring now to FIGS. 8, 9A, 9B, and 10, a fourth embodiment of the CTFM detection apparatus 110 is discussed. According to the fourth embodiment, the CTFM detection apparatus 110 may also further comprise a second sensor 114a configured to form a second reception beam RBa directed downward and laterally outward to a second side 102a of the boat or ship 101 and receive a second reflected wave. The second reflected wave may comprise a reflection of the transmission wave 122. The transmission wave transmitted by the projector 112 in this configuration may form a transmission beam TB directed downward and laterally outward to both said side 102 of the boat or ship 101 and said second side 102a of the boat or ship 101. Furthermore, the hardware processor 118 may be further programmed to at least generate a second beat signal 152a based at least in part on the transmission signal 136 and a second received signal 130a generated from the second reflected wave, as well as generate a second image information 138a based on an extracted second processing signal 154a extracted from the second beat signal 152a.

The transmission beam TB of this configuration may also have a particular transmission beam width $W_{TB}$ in a longitudinal direction 108 of the boat or ship 101, the reception beam RB may have a particular reception beam width $W_{RB}$ in the longitudinal direction 108 of the boat or ship 101, and the second reception beam RBa may have a particular second reception beam width $W_{RBa}$ in the longitudinal direction 108 of the boat or ship 101, with the transmission beam width $W_{TB}$ being wider than the reception beam width $W_{RB}$ and the second reception beam width $W_{RBa}$.

Since the CTFM detection apparatus 110 of the fourth embodiment is generally similar to that of the other embodiments, with the exception of the second sensor 114a configured to form the second reception beam RBa, having the second reception beam width $W_{RBa}$, directed to the second side 102a of the boat or ship 101 and receive the second reflected wave 128a, detailed description thereof is abbreviated here for the sake of brevity. The configuration of the fourth embodiment may also incorporate aspects of any of the other embodiments of the present disclosure. It is to be noted that like parts are designated by like reference numerals throughout the detailed description and the accompanying drawings.

Figure 9A:
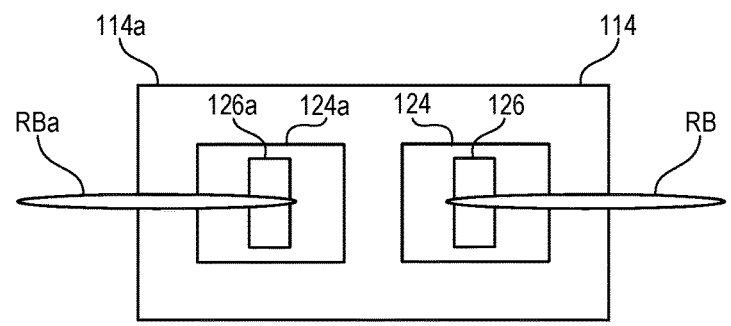
FIG. 9A is a bottom view schematically illustrating ultrasonic transducers of the fourth embodiment of a CTFM detection apparatus along with shapes of reception beams formed by the ultrasonic transducers.
Figure 9B:
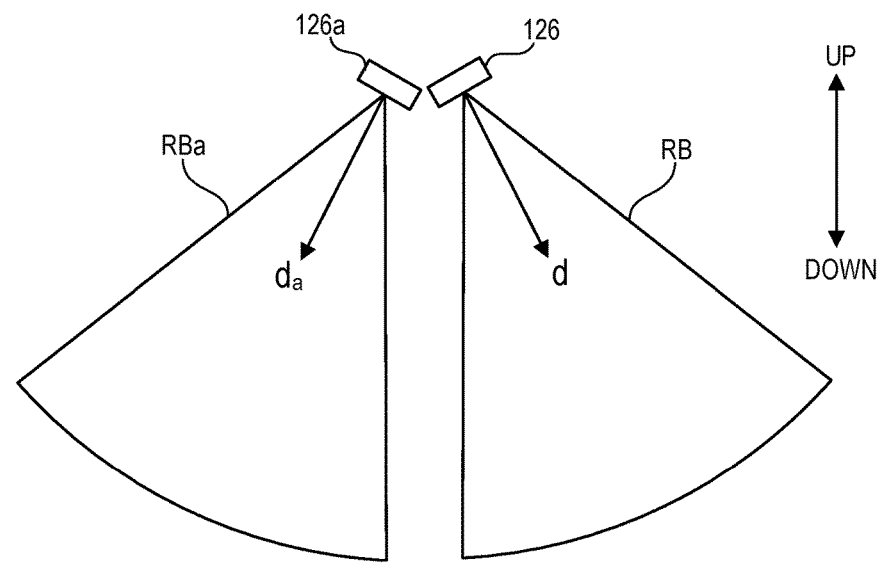
FIG. 9B is a side view schematically illustrating the ultrasonic transducers in FIG. 9A along with the shapes of the reception beams formed by the respective ultrasonic transducers.

As illustrated in FIGS. 9A and 9B, the sensor 114 and the second sensor 114a may each have one or more ultrasonic transducers 124 and 124a, which may also be referred to as receiving elements. The ultrasonic transducers 124 and 124a may have receiving surfaces 126 and 126a exposed to the water where the ultrasonic wave is received. The receiving surfaces 126 and 126a are arranged to face downward and laterally outward. Specifically, the receiving surfaces 126 and 126a are arranged so that the receiving surfaces 126 and 126a extend perpendicular to directions d and $d_a$, the directions d and $d_a$ inclining with respect to the vertically downward direction and oriented away from each other.

Moreover, as illustrated in FIG. 9A, the receiving surfaces 126 and 126a are arranged so that short sides of the receiving surfaces 126 and 126a extend in the same direction as each other when seen in the up/down direction. Thus, the reception beams RB and RBa are formed in the same vertical plane. Further, as described above and shown in FIG. 9B, by arranging the receiving surfaces 126 and 126a to face away from each other, the reception beams RB and $RB_a$ do not overlap. Note that a beam axis of the reception beam is an axis within the reception beam and extending in a direction where the highest reception sensitivity is obtained.

Figure 10:
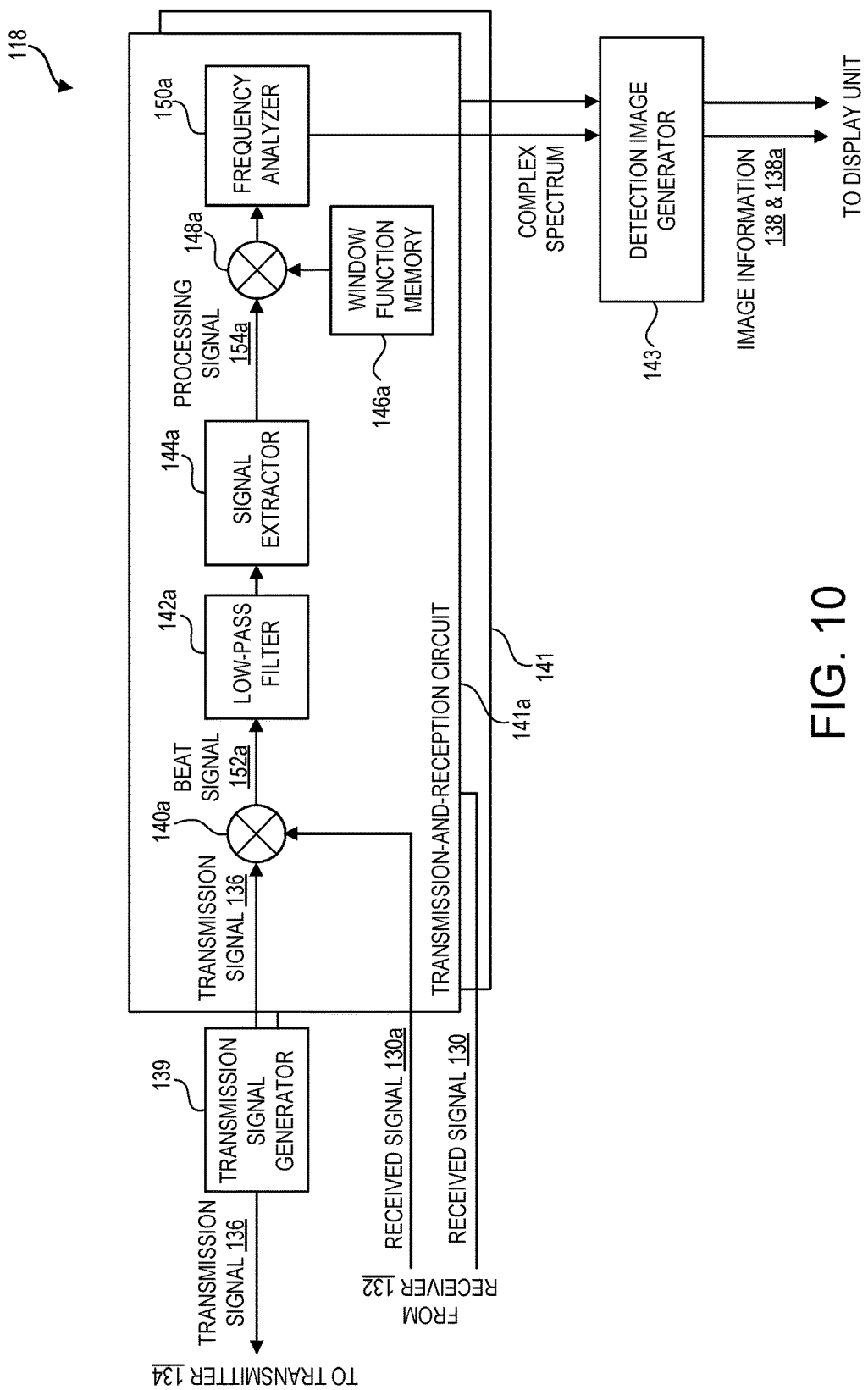
FIG. 10 is a block diagram illustrating a configuration of a hardware processor according to the fourth embodiment of the CTFM detection apparatus, having two transmission-and-reception circuits.

Turning now to FIG. 10, the fourth embodiment of the CTFM detection apparatus is described in more detail. The receiver 132 may have two receive circuits (not illustrated), and each receive circuit may perform the processing described in the first embodiment on the received signal (130 or 130a) obtained by electroacoustically converting the reflected wave (128 or 128a) received by the corresponding ultrasonic transducer (124 or 124a), and outputs the processed received signal to the hardware processor 118.

The hardware processor may have two transmission-and-reception circuits 141 and 141a. Each of the transmission-and-reception circuits 141 and 141a receives the transmission signal 136 generated by the transmission signal generator 139 and the received signal 130 or 130a generated by the corresponding receive circuit (the received signal obtained by the corresponding one of the ultrasonic transducers 124 and 124a). Specifically, the transmission-and-reception circuit 141 receives the received signal obtained by the ultrasonic transducer 124, whereas the transmission-and-reception circuit 141a receives the received signal obtained by the ultrasonic transducer 124a.

Each of the transmission-and-reception circuits 141 and 141a includes a first multiplier 140 and 140a, a low-pass filter 142 and 142a, a signal extractor 144 and 144a, a window function memory 146 and 146a, a second multiplier 148 and 148a, and a frequency analyzer 150 and 150a. Note that, each of the transmission-and-reception circuits 141 and 141a performs the same processing except that the received signal inputted to each transmission-and-reception circuit is different as each received signal is generated based on a different ultrasonic transducer.

In the first multipliers 140 and 140a of the hardware processor 118 of the above embodiment, the transmission signal 136 generated by the transmission signal generator 139 and the received signals 130 and 130a corresponding to the waveform of the ultrasonic waves received by the ultrasonic transducers 124 and 124a are combined (e.g. mixed or multiplied) with each other to generate the beat signals 152 and 152a; however, without limiting to this, a signal based on the transmission signal 136 and a signal based on the received signals 130 and 130a may be combined. For example, a signal that causes a frequency offset on the transmission signal and the received signals may be combined to generate the beat signal. In this manner, echo data in which influence of a direct current offset that may occur due to the A/D conversion by the receiver 132 is reduced can be obtained as the output of the hardware processor 118.

Finally, in the hardware processor 118, the complex spectra corresponding to the ultrasonic transducers 124 and 124a are generated by the transmission-and-reception circuits 141 and 141a, respectively. The complex spectrum generated by each frequency analyzer 150 and 150a is outputted to the detection image generator 143, and the detection image generator 143 outputs image information 138 and 138a. It should be obvious that other aspects of the fourth embodiment of the CTFM detection apparatus 110 are generally similar to those of the previous embodiments, and are therefore not discussed in detail. Furthermore, extraction of the processing signal 154 and 154a may be performed in accordance with any of the aforementioned embodiments.

In the above embodiments and modifications, the CTFM detection apparatus 110 is described as the underwater detection apparatus as an example; however, without limiting to this, a radar, etc., may be given as the CTFM detection apparatus.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While specific embodiments of a CTFM detection apparatus have been described in detail, the particular arrangements disclosed are meant to be illustrative only and not limiting. The features of the various embodiments described above may be variously combined without departing from the scope of this disclosure. It should also be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A Continuous Transmission Frequency Modulated (CTFM) detection apparatus designed to be installed on a boat or a ship, comprising:
    a projector configured to repeatedly transmit underwater a frequency modulated transmission wave at a particular repetition rate based on a transmission signal;
    a sensor configured to form a reception beam directed downward and laterally outward to a side of the boat or the ship and receive a reflected wave, the reflected wave comprising a reflection of the transmission wave on a target object; and
    a hardware processor, operatively coupled to the projector and sensor, programmed to at least:
        generate a beat signal based at least in part on the transmission signal and the reflected wave,
        repeatedly extract a processing signal from the beat signal at a particular extraction rate, the particular extraction rate being faster than the particular repetition rate of the transmission wave, and
        generate an image information related to the target object based on the extracted processing signal.

2. The CTFM detection apparatus of claim 1, wherein the hardware processor is further programmed to at least:
    acquire a velocity of the boat or the ship, and
    adjust the particular extraction rate based at least in part on the velocity.

3. The CTFM detection apparatus of claim 2, wherein the hardware processor is further programmed to at least:
    increase the particular extraction rate as the velocity increases.

4. The CTFM detection apparatus of claim 1, wherein the hardware processor is further programmed to at least:
    acquire a velocity of the boat or the ship, and
    extract the processing signal so that the processing signal has a duration, the duration being based at least in part on the velocity.

5. The CTFM detection apparatus of claim 4, wherein the hardware processor is further programmed to at least:
    increase the duration as the velocity increases.

6. The CTFM detection apparatus of claim 1, wherein the hardware processor is further programmed to at least:
    acquire a velocity of the boat or the ship,
    extract the processing signal so that the processing signal has a duration, and
    adjust the particular extraction rate and the duration based at least in part on the velocity.

7. The CTFM detection apparatus of claim 1, wherein
    the transmission wave transmitted by the projector forms a transmission beam directed downward and laterally outward to said side of the boat or the ship, the transmission beam having a particular transmission beam width in a longitudinal direction of the boat or ship; and
    the reception beam has a particular reception beam width in the longitudinal direction of the boat or ship, the transmission beam width being wider than the reception beam width.

8. The CTFM detection apparatus of claim 1, further comprising:
    a second sensor configured to form a second reception beam directed downward and laterally outward to a second side of the boat or ship and receive a second reflected wave, the second reflected wave comprising a reflection of the transmission wave, wherein
    the transmission wave transmitted by the projector forms a transmission beam directed downward and laterally outward to both said side of the boat or ship and said second side of the boat or ship; and
    the hardware processor is further programmed to at least:
        generate a second beat signal based at least in part on the transmission signal and the second reflected wave, and
        generate a second image information based on an extracted second processing signal extracted from the second beat signal.

9. The CTFM detection apparatus of claim 8, wherein
    the transmission beam has a particular transmission beam width in a longitudinal direction of the boat or ship;
    the reception beam has a particular reception beam width in the longitudinal direction of the boat or ship;
    the second reception beam has a particular second reception beam width in the longitudinal direction of the boat or ship; and
    the transmission beam width is wider than the reception beam width and the second reception beam width.

10. The CTFM detection apparatus of claim 1, further comprising:
    a display, operatively coupled to the hardware processor, configured to display the image information.

* * * * *